Nov. 28, 1939.  H. M. GOREY  2,181,548
SCRUBBING MACHINE
Filed April 19, 1935
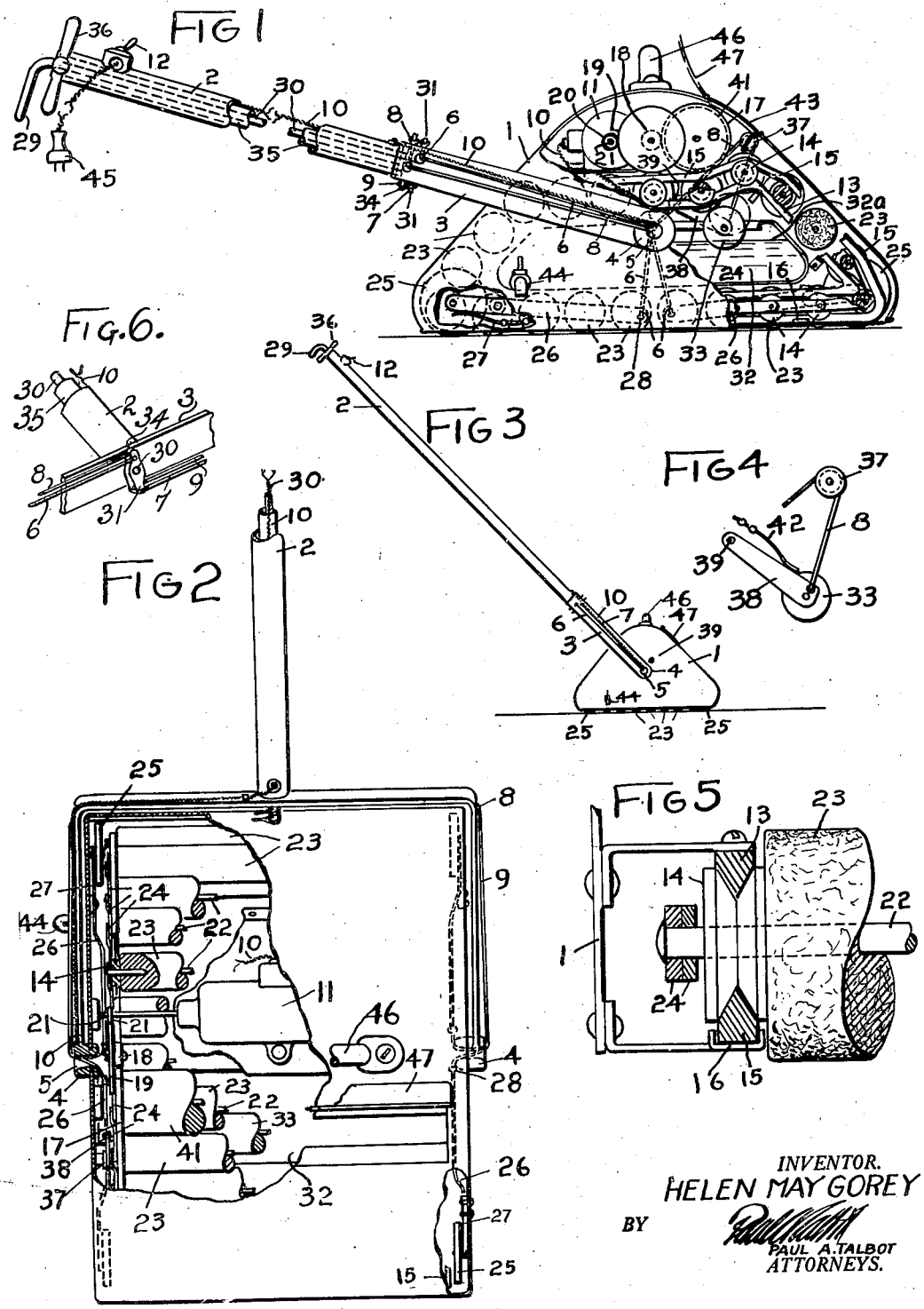
INVENTOR.
HELEN MAY GOREY
BY
PAUL A. TALBOT
ATTORNEYS.

Patented Nov. 28, 1939

2,181,548

UNITED STATES PATENT OFFICE 2,181,548

SCRUBBING MACHINE

Helen May Gorey, New York, N. Y.

Application April 19, 1935, Serial No. 17,200

7 Claims. (Cl. 15—99)

My invention relates to a machine for scrubbing floors and particularly to an electrically operated machine for scrubbing and drying floors, having many improvements, purposes and objects, some of which are as follows:

One of the objects of my device is to scrub and clean floors by using soap and other liquid cleansers and an electric motor to drive and perform the laborious rubbing necessary.

To provide an electric scrubbing machine which may be easily regulated from the switches and levers on its handle to perform all of the operations essential in scrubbing floors and other flat surfaces.

To provide a power operated scrubbing machine which will not only scrub the surface clean but distribute the cleansing liquid and remove it from the floor to dry the surface after scrubbing.

To provide a light and compact machine suitable for the housewife to conveniently clean floors where liquid cleansers are necessary.

I accomplish these and other objects by the construction herein described and shown in the accompanying drawing which forms a part hereof in which:

Figure 1 is an elevation of my device with parts broken away to show the interior.

Figure 2 is a fragmentary plan view showing the contact rolls, wringer rolls, and the driving wheels.

Figure 3 is a side elevation of my device.

Figure 4 is a detail of the wringer operating mechanism.

Figure 5 is a fragmentary view of one of the contact rolls.

Figure 6 is a fragmentary view showing the operation of the lever arms.

Similar reference characters refer to similar parts throughout the several views of the accompanying drawing and in the following specification.

My scrubbing machine comprises the housing 1 containing and supporting the mechanism hereinafter more fully described. The tubular handle 2 is swingingly attached to the housing by means of the arms 3 and the hollow bearings 4 which are journalled on each side of said housing 1 and the hollow centers 5 are provided with well rounded edges to permit the movement of the control cords 6, 7, 8 and 9 as well as the electric cable 10 which supplies the motor 11 and which is carried within the tubular handle 2 to the switch 12 on the handle thus affording a means of starting and stopping said motor 11.

The cords operate the mechanism within the housing such as raising my device from the scrubbing and also the drying position at which time the parts are in contact with the floor, to the raised position when it may be freely wheeled about the room and the cords are necessarily brought to the center from which the handle swings. The hollow centers 5 at the center about which the handle swings, facilitate the operation of either the cords or handle without one affecting the other.

The central opening or hollow center 5 serves as a pulley as its edges are well rounded and smooth permitting the cords to slide over this surface when they are pulled as will be hereafter more fully described.

The free swinging of the handle over a wide angle from the front to the back of my machine is desirable not only to permit my device to scrub under tables, stoves, etc. but the swinging of the handle is also desirable when reversing the direction of travel without turning the machine around even though the scrubbing mechanism tends to propel the machine in one direction only. The propelling action is proportional to the pressure of the moving parts in contact with the floor, the pressure being adjusted from the handle by the operator.

Within the housing 1 and secured to its inner side walls, I have provided the stationary rails 13 which are preferably faced with rubber or similar resilient material and are V shaped on one face in which the V grooved rollers 14 are made to run and due to the added friction of the V shape are prevented from slipping.

The V belts 15 moving in their guides 16 secured to said housing 1 like the stationary rails 13 also engage the V grooved rollers 14 causing said rollers to revolve and travel progressively along said rails 13 like the tread of a caterpillar tractor. The surface of the rollers contacting the floor however, travels in the opposite direction in relation to the progression of the rollers in traveling along the stationary rails.

The V belts 15 as well as the rollers 14 and stationary rails 13 are duplicated on each side of my machine as are the friction drive wheels 17 which impart motion to said V belts 15. Each of the friction drive wheels is revolved by the reduction train of wheels 18, 19 and 20. The wheels 20 are secured to the armature shaft 21 of the electric motor 11.

Between the V grooved rollers 14 at each side of my machine and secured on the roller shafts 22 I have provided the revolving scrubbing contact rolls 23 which are slightly less in length than the width of my device; each of said scrubbing contact rolls being driven by two of said rollers 14 and the motor 11 as above described through the belts 15 and wheels driving said belts.

The contact rolls 23 are preferably of spongy rubber or other absorbent material which may carry the cleansing liquid as well as of a composition which may be wrung out dry by pressure as will hereinafter be further described.

The bottom surface of my machine as may be seen by the drawing is composed of a plurality of said contact rolls 23 which form an endless train, each roll revolving and the train of rolls progressing in a horizontal direction. The contact rolls are spaced and retained at the desired distance apart by the links 24 at each end of the roller shafts 22.

My machine is easily moved along the floor or other flat surfaces on the four wheels 25 each of which is rotatably mounted in the end of each of the levers 26 which are pivotally secured to the housing 1 and normally forced by the springs 27 to raise the wheels clear of the floor thus allowing the contact rolls to make contact during the scrubbing and drying operations. The opposite ends of the levers 26 are provided with apertures 28 which afford a means of securing the operating and controlling cords 6 and 7 which are actuated by the lever 29 on the end of the handle 2 of my device. Thus the scrubbing contact rolls as well as the housing and other parts are easily raised and lowered and the pressure of the contact rolls against the floor may be easily regulated by said lever 29 as desired.

The lever 29 is secured to the shaft 30 which is journalled to oscillate within the hollow tubular handle 2. At the opposite or lower end of the shaft 29 is provided the diametrically opposite arms 31 each being secured to the control cords 6 or 7 which in turn are secured to the levers 26 after passing through the arms 3 and the hollow centers 5 of the bearings 4.

Attention is directed to the hollow centers and the manner of connecting the various cords and cables which pass therethrough as by this means the handle 2 may be raised or lowered and swung in any position without disturbing the adjustment of the parts within the housing 1 which are actuated by said cords.

The train of contact rolls after traveling horizontally parallel with the floor are guided upwardly at the end of my device and back over the liquid tank or reservoir 32 which is suitable for storing the cleansing compound which may be soap and water or solutions of various chemicals used for cleansing or scrubbing.

The level of said liquid 32a is so regulated that the wringer roller 33 is partly under said liquid level 32a when in its lowered position and also in contact with the contact rolls 23 thus wetting each roll as it in turn comes in contact with said roller 33. By raising said roller it not only clears the liquid but also squeezes the contact rolls wringing the moisture therefrom thus drying the floor by means of the contact rolls as well as wetting it as desired by the raising and lowering of said roller 33.

The cords 8 and 9 which operate the roller 33 are connected at one end to the diametrically opposed arms 34 secured to the lower end of the sleeve 35 journalled within the tubular handle 2 and between said handle and the shaft 30. The upper end of said sleeve 35 is provided with the hand wheel 36 suitable to oscillate said sleeve 35 and arms 34 to pull the cords 8 and 9 the opposite ends of which after passing through the arms 3 and into the housing 1 through the hollow centers 5 pass over the pulleys 37 which are secured to said housing 1. The ends of said cords are secured to the levers 38 which swingingly support said roller 33 from the pivotal center 39. The shaft of the drive wheels 17 and roller 41 which is secured to and driven by said wheels is so positioned that as said roller 33 is raised it is drawn toward said roller 41 and as the train of brushes 23 pass between the rollers 33 and 41 they are squeezed and wrung dry, the liquid draining back into the tank 32 to be used over if desired.

I have provided the springs 42 which aided by the weight of the roller 33 is arranged to retract and lower said roller to the wetting position above described. Thus by turning said hand wheel 36 the cords are pulled raising the roller 33 to wring the moisture from the train of revolving contact rolls 23 as they progressively pass between the rollers 41 and 33.

To fill liquid into the tank 32 I have provided an opening 43 and to drain the liquid therefrom I have provided the valve 44.

Current may be supplied for operating the electric motor 11 in much the same manner as a vacuum cleaner and other electrically operated household appliances by a cable and plug 45 which may be easily attached to any convenient wall socket supplying electric current.

The housing 1 is preferably provided with the handle 46 suitable to carry my device independent of the handle 2. The filling opening is shown as provided with a hinged cover 47.

I do not wish to be limited to the exact construction shown and described herein as I may wish to depart therefrom for various sizes and purposes within the scope of the appended claims which succinctly set forth my invention.

I claim:

1. In a scrubbing machine having an endless train of floor contacting scrubbing rollers of spongy material and means driving said rollers to revolve and move them progressively and a tank over which said rollers pass, a wringer roll vertically adjustable in relation to said tank to contact the liquid level therein while contacting the surface of said scrubbing rollers as they progress in their travel over said tank to wet said scrubbing rollers when said wringer roll is lowered and to wring the moisture from said scrubbing rollers by applying pressure against said rollers by and when said wringer roll is raised out of the liquid in said tank and a housing supporting said rolls, said driving means and said tank.

2. In a scrubbing machine comprising supporting means for the moving parts therein and movable along the floor and having a plurality of floor contacting scrubbing rollers connected to form an endless train and having driving means whereby said scrubbing rollers are revolved and said train moved progressively along the floor and relative to said supporting means, a tank over which said scrubbing rollers pass and a wringer roll vertically adjustable and partly immersed below the liquid level in said tank when lowered and thereby wetting said scrubbing rollers as they progress over and contact said wringer roll, and when raised above the liquid level in said tank, said wringer roll being adapted to wring the moisture from said scrubbing rollers by compressing them.

3. In a scrubbing machine having a plurality of floor contacting scrubbing rollers, a housing in which said rollers are revolved and mounted to progress along the floor being scrubbed, wheels and levers rotatably supporting said wheels, said levers being pivotally mounted in said housing, a handle swingingly secured to said housing and means attached to said handle and to the opposite ends of said levers from said wheels for raising and lowering said wheels in relation to said housing, said means comprising cords passing through the hollow axial center on which said handle is swung whereby said handle may be swung without raising and lowering said wheels and whereby pressure of the scrubbing rollers on the floor may be adjusted unaffected by the swinging of said handle.

4. In a floor scrubbing and drying machine having a housing and a train of rollers movable along and revolved in relation to the floor being scrubbed, means for regulating the pressure of contact of said rollers and the removal of said rollers from the floor comprising a swingable handle mounting said pressure regulating means, said handle having hollow axial bearings mounting said handle on said housing, wheels, and levers pivotally connecting the wheels to the housing and cords passing through said hollow bearings to raise and lower the housing, one end of said cords being attached to the opposite end of said levers from said wheels thereby depressing said wheels by raising said opposite end, said cords having their opposite ends secured to said pressure regulating means on said handle.

5. In a floor scrubbing and drying machine having a housing and a liquid receiving tank therein and a train of rollers movable along and revolved in relation to the floor being scrubbed, a swingable handle having hollow axial bearings mounting said handle on said housing and cords passing through said hollow bearings, a vertically adjustable wringer and wetting roll and means connected to said cords movably mounting said roll within said housing to contact the liquid in said tank to wet said train of rollers when lowered and when raised to wring the moisture from said rollers, said wringing and wetting roll operating means, permitting independent movement of said handle.

6. In a floor scrubbing and drying machine, a housing, a train of rollers movable along the floor and revolved in relation to said housing and to the floor being scrubbed, means adjusting the pressure of contact of said rollers on the floor comprising a handle, and levers mounted in said housing movably independently of said handle, hollow axial bearings in said housing mounting said handle on said housing and cords passing through said hollow bearings secured to said levers on said handle, levers pivotally mounted in said housing secured to said cords at one end and wheels secured to the opposite end of said levers and connected to said levers mounted on said handle by said cords, said means on said handle operating said levers connected by said cords to raise and lower said housing by said wheels and the levers secured thereto.

7. In a floor scrubbing and drying machine having a housing and a train of rollers in said housing and movable along and revolved in relation to the floor being scrubbed, a swinging handle having hollow axial bearings mounting said handle in said housing and cords passing through said hollow bearings, a tank, a wringer and wetting roll and bearings movably mounting said roll within said housing above said tank to wet said train of scrubbing rollers when said roll is lowered into said liquid and wring the moisture from said scrubbing rollers when said roll is raised out of said liquid, said roll being held in contact with said train of rollers, said cords being operatively connected to raise and lower said wetting and wringer roll and levers secured to said cords and mounted on said handle, and means on said handle for operating said levers and cords to move said wringing and wetting roll independent of the swinging of said handle.

HELEN MAY GOREY.